US010460017B2

(12) United States Patent
Johnson

(10) Patent No.: US 10,460,017 B2
(45) Date of Patent: Oct. 29, 2019

(54) PROVISION OF ALTERNATIVE TEXT FOR USE IN ASSOCIATION WITH IMAGE DATA

(71) Applicant: International Business Machines Corporation, Armonk, NY (US)

(72) Inventor: Andrew Johnson, Winchester (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 447 days.

(21) Appl. No.: 15/421,270

(22) Filed: Jan. 31, 2017

(65) Prior Publication Data

US 2017/0139883 A1 May 18, 2017

Related U.S. Application Data

(63) Continuation of application No. 13/936,163, filed on Jul. 6, 2013, now Pat. No. 9,575,940.

(30) Foreign Application Priority Data

Jul. 30, 2012 (GB) .................................. 1213524.0

(51) Int. Cl.
*G06F 17/00* (2019.01)
*G06F 17/22* (2006.01)
(Continued)

(52) U.S. Cl.
CPC ...... *G06F 17/2247* (2013.01); *G06F 16/9558* (2019.01); *G06F 17/211* (2013.01); *G06F 17/2235* (2013.01); *G06F 17/2705* (2013.01)

(58) Field of Classification Search
CPC .................................................. G06F 17/2235
See application file for complete search history.

(56) References Cited

U.S. PATENT DOCUMENTS 6,487,588 B1  11/2002  Phillips et al.
6,587,822 B2   7/2003  Brown et al.
(Continued)

FOREIGN PATENT DOCUMENTS

WO   2009009442   1/2009

OTHER PUBLICATIONS

Jacobs et al., "Architecture of the World Wide Web, Volume One," W3C Recommendation Dec. 15, 2004, p. 1-43, retrieved from http://www.w3.org/TR/webarch/#media-type-fragid.*
(Continued)

*Primary Examiner* — Amelia L Tapp
(74) *Attorney, Agent, or Firm* — James L. Baudino

(57) ABSTRACT

A method for providing alternative text for use in association with an image in a web page includes processing, by a web browser application program, code for a web page to display the web page. The web browser application program identifies from the code a URI specifying an image data file for an image to be displayed in the web page. The web browser application program determines whether the URI of the image data file includes a fragment identifier and, in response to determining that the image data file includes a fragment identifier, determines whether text follows the fragment identifier. In response to determining that text follows the fragment identifier, the text is used to identify alternative text for the image and the web page is rendered with the alternative text in place of the image.

20 Claims, 3 Drawing Sheets

(51) Int. Cl.
*G06F 17/27* (2006.01)
*G06F 17/21* (2006.01)
*G06F 16/955* (2019.01)

(56) References Cited

U.S. PATENT DOCUMENTS

| | | | |
|---|---|---|---|
| 7,228,495 | B2 | 6/2007 | Adapathya et al. |
| 7,783,624 | B2 | 8/2010 | Martinez et al. |
| 2003/0126461 | A1 | 7/2003 | Barker et al. |
| 2005/0055627 | A1 | 3/2005 | Lloyd et al. |
| 2007/0067741 | A1 | 3/2007 | Spisak |
| 2007/0211071 | A1 | 9/2007 | Slotznick et al. |
| 2010/0180011 | A1 | 7/2010 | Sood et al. |
| 2011/0029876 | A1 | 2/2011 | Slotznick et al. |
| 2014/0164352 | A1* | 6/2014 | Denninghoff ...... H03H 9/02622 707/711 |

OTHER PUBLICATIONS

Graham, "Imagemapped Images and Image-Incapable User Agents," W3C Note Nov. 27, 1996, p. 1-5, retrieved from http://www.w3.org/TR/NOTE-imagemap.*

Bigham, Jeffrey R, et al.; "WebInSight: Making Web Images Accessible"; Assets '06 Proceedings of the 8th International ACM SIGACCESS conference on Computers and accessibility; Oct. 22-25, 2006, 8 pages.

Craven, Timothy C.; "Some features of alt texts associated with images in Web pages"; Information Research; vol. 11, No. 2; Jan. 2006, 16 pages.

Darren; "alt tags on URL's" (forums.seochat.com/seo-help-general-chat-16/alt-tags-on-url-s-27069.html); Mar. 2005, 1 page.

Seo-Anand; "Using ALT Tag in URL Links" (forums.digitalpoint.com/showthread.php?t=122106&highlight=%22alt+TAG+in+URI%22); Aug. 10, 2006, 1 page.

Search Report; UK Patent Application No. GB1213524.0; dated Nov. 15, 2012, 3 pages.

Tennison; Hash URIs; W3C Blog; May 12, 2011; pp. 1-14.

Liu; Developing Applications with Facelets, JSF, and JSP; Java.net; Aug. 29, 2006; pp. 1-9 (available at https://today.java.net/pub/a/today/2006/08/29/developing-with-facelets-jsf-jsp.html).

CSS Wizardry; Styling at text on images; Jun. 18, 2011; pp. 1-4 (available at http://csswizardry.com/2011/06/styling-aft-text-on-images/).

* cited by examiner

```
<img src "http://www.ibm.com/image1.jpg#alternative text 1">
<img src "http://www.ibm.com/image2.jpg#alternative text 2">
<img src "http://www.ibm.com/image3.jpg">
<img src "http://www.ibm.com/image4.jpg#alternative text 3">
```

PROVISION OF ALTERNATIVE TEXT FOR USE IN ASSOCIATION WITH IMAGE DATA

BACKGROUND

Graphical user interfaces for devices are commonly used to display images. Such images may represent interface icons or pictures. In order to provide fuller accessibility for the interface, alternative text may be provided for display in conjunction with an associated image or instead of the image. Such alternative text is commonly referred to as alt-text. Generally, such alternative text is arranged to provide a description of the associated image and thus provides an alternative means for communicating the image based content and options of the interface to a user.

A number of methods are used for providing the alternative text for an associated image. For example, the alternative text for an image in a hypertext mark-up language (HTML) web page is commonly specified in an "alt" field within the HTML specification of the image.

One problem is that alternative text is coded at the point of use of the image. This is a time consuming process. If the alternative text is associated with a given image file, the image file, or a reference to it, may be passed around a given program or between programs and thus may become separated from any associated alternative text.

BRIEF SUMMARY

An embodiment of the invention provides a method, system, and computer program product for providing alternative text for use in association with image data specified by a uniform resource identifier (URI). In one embodiment, a method for providing alternative text for use in association with an image in a web page includes processing, by a web browser application program, code for a web page to display the web page. The web browser application program identifies from the code a URI specifying an image data file for an image to be displayed in the web page. The web browser application program determines whether the URI of the image data file includes a fragment identifier and, in response to determining that the image data file includes a fragment identifier, determines whether text follows the fragment identifier. In response to determining that text follows the fragment identifier, the text is used to identify alternative text for the image and the web page is rendered with the alternative text in place of the image.

The alternative text may be identified by a predetermined identifier within the URI. The predetermined identifier may comprise a reserved character in the URI. The standard specified function of the reserved character may be contextually redundant. The identifier may comprise a fragment identifier. The image data identified by the URI may be retrieved for use in association with the alternative text. The alternative text may be arranged for use in place of the image data. The alternative text data may comprise one or more other data types. The alternative text data within the URI may comprise a reference identifying alternative text provided externally to the URI. The URI may be encoded within a page arranged for viewing via a web browser application program. The URI may comprise a uniform resource locator (URL).

Another embodiment provides an apparatus for providing alternative text for use in association with image data specified by a URI. The apparatus is operable to identify a URI specifying image data, process the URI to identify data representing alternative text encoded within the URI, and extract any identified alternative text data for use in association with the image data.

A further embodiment provides a computer program product for providing alternative text for display in association with image data, the computer program product comprising a computer-readable storage medium having computer-readable program code embodied therewith. The computer-readable program code is configured to identify a URI identifying image data for display, process the URI to identify data representing alternative text encoded within the URI, and extract any identified alternative text data for display in association with the image data.

Another embodiment provides a method for producing a URI comprising alternative text for use in association with image data. The method comprises identifying a URI specifying image data, determining alternative text data for use in association with the image data, encoding the alternative text data within the URI, and providing the URI comprising the internally encoded alternative text data for use in association with the image data.

A further embodiment provides a URI for identifying image data. The URI identifies the image data and includes alternative text data encoded within the URI where the alternative image data is arranged for use in association with the image data.

Embodiments of the invention enable alternative text data or other alternative data associated with image data identified by a URI to be passed around together within a computer program or between computer programs or otherwise communicated. In other words, once alternative text or other data has been associated with given image data identified by a URI, the possibility of the image data being separated from its associated alternative text data is reduced.

Viewed from a further aspect, the present invention provides a computer program product for providing alternative text for display in association with image data, the computer program product comprising: a computer readable storage medium readable by a processing circuit and storing instructions for execution by the processing circuit for performing a method for performing the processes of the invention.

Viewed from a further aspect, the present invention provides a computer program stored on a computer readable medium and loadable into the internal memory of a digital computer, comprising software code portions, when said program is run on a computer, for performing the processes of the invention.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
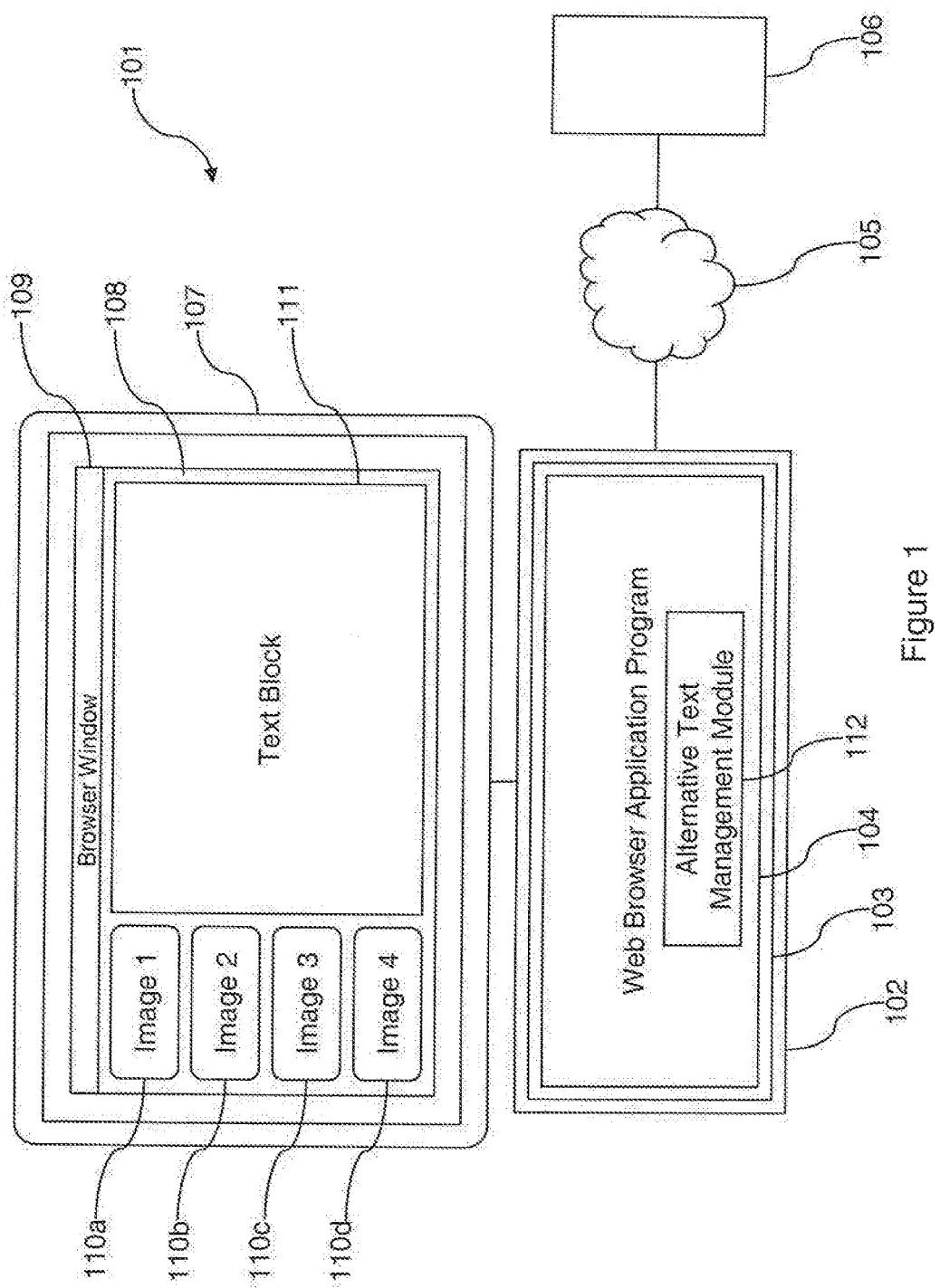
FIG. 1 is a schematic illustration of a computer system comprising a web browser application arranged to display alternative text for images in web pages, according to a preferred embodiment of the present invention.

With reference to FIG. 1, a computer system 101 comprises a computer 102 running an operating system 103 providing a processing platform for one or more application programs such as a web browser application program 104. The computer 102 is connected to a network 105 arranged to provide access to one or more other computers such as a web server 106. The first computer is provided with a visual display 107. The web browser application program 104 enables a user to access one or more web pages 108 provided by the web server 106 over the network 105 and to display such web pages in a browser window 109 on the display 107.

In the present embodiment, the web page 108 is coded using the hypertext mark-up language (HTML). The web browser application program 104 is arranged to process the HTML web page 108 to create an image of the web page 108 for provision by visual display in the browser window 109. As shown in FIG. 1, the web page comprises four images 110 and a block of adjacent text 111. In the present embodiment, the web browser 104 comprises an alternative text management module 112 operable to display alternative text for images in web pages. Such alternative text is displayed in accordance with user-set alternative text preferences in the web browser 104.

Figures 2, 3:
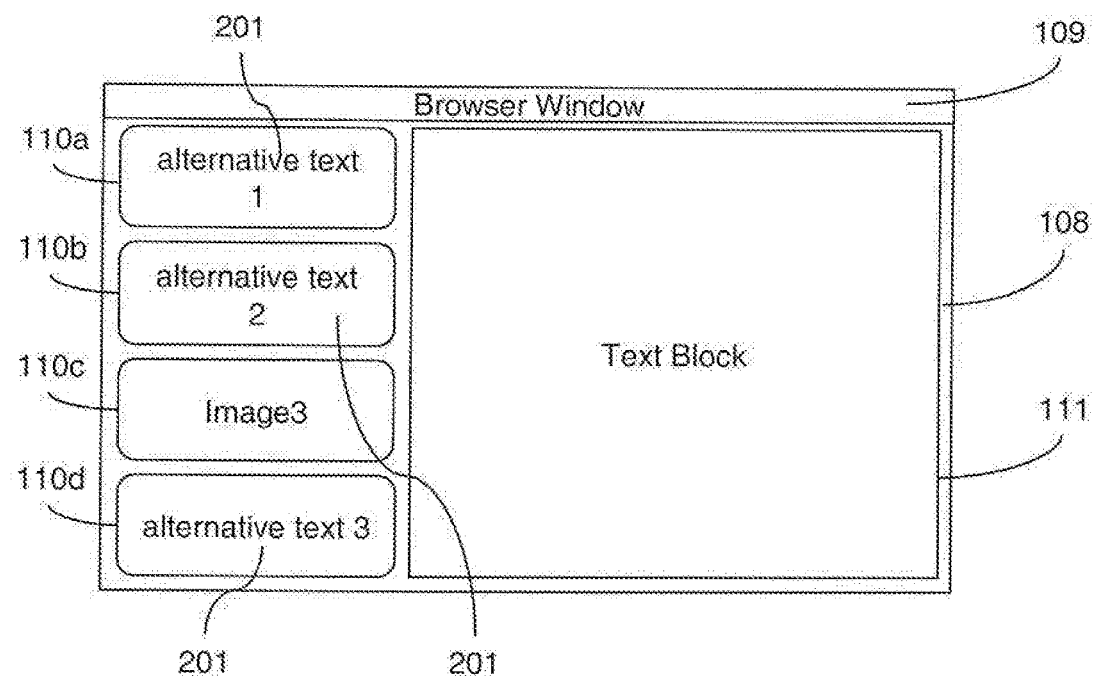
FIG. 2 is a schematic illustration of a web page in which alternative text is displayed according to a preferred embodiment of the present invention.
FIG. 3 is an HTML statement specifying an image via a URL that comprises alternative text, according to a preferred embodiment of the present invention.

In the present embodiment, with reference to FIG. 2, enabling the display of alternative text in the preferences of the web browser 104 results in any of the images 110, having associated alternative text, being replaced by that alternative text. For example, in FIG. 2, the first, second and fourth images 110a, 110b, 110d are substituted for their associated alternative text 201. The third image 110c has no such associated text and so no substitution is made.

In the present embodiment, the alternative text 201 for a given image 110 is encoded within a universal resource identifier (URI) of the image data file for the relevant image 110, in the form of the universal resource locator (URL) 301 of the image file. FIG. 3 shows the sections of HTML code of the web page 108 that identify each of the images 110. In each case, the URL of the relevant image file 302 defines the source of the relevant image data. In the present embodiment, the alternative text 201 is encoded within the URL 301 using a reserved character in URL syntax. In the present embodiment, the reserved character comprises the fragment identifier, specified by the hash symbol (#).

The fragment identifier specifies an optional element of a URL commonly used by web browser application programs to identify a position within a web page at which to initiate the display of a given page. Thus, in the context of loading image data from a source image file, the fragment identifier has no defined function. In other words, in the context of loading image data for display, the fragment identifier is contextually redundant. In the present embodiment, the alternative text management module 112 is operable, when loading image data for use in a web page 108, to process the URL for the image files 302 to identify any fragment identifier. If a fragment identifier is present, the subsequent text is extracted as alternative text for display in place of the associated image data. Thus the alternative text 201 is displayed in the rendered web page 108 in place of the associated image. In the present embodiment, if no alternative text is specified after the fragment identifier, no substitution of the image is made.

Figure 4:
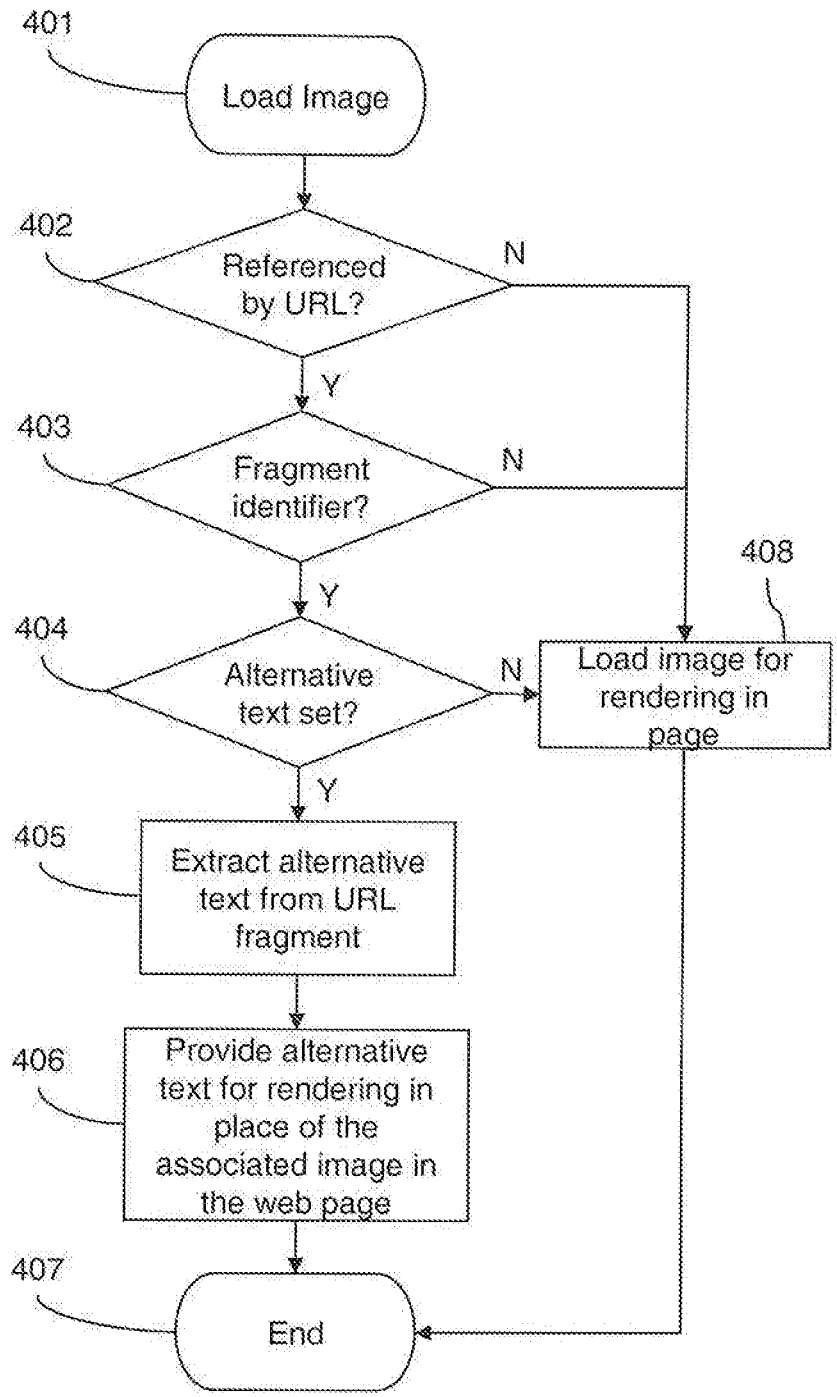
FIG. 4 is a flow chart illustrating processing performed in the computer system of FIG. 1 when displaying alternative text from an image URL according to FIG. 3, according to a preferred embodiment of the present invention.

The processing performed by the alternative text management module 112 will now be described with reference to the flow chart of FIG. 4. Processing is initiated at step 401 in response to the processing of an image source (img src) definition in the source code for the web page 108 being processed for display by the web browser 104. Processing then moves to step 402 where the specification of the image source is inspected to determine whether it comprises a URL and if so processing moves to step 403. At step 403 the URL is inspected to determine whether it comprises a fragment identifier and if so processing moves to step 404. At step 404 the URL is inspected to determine whether alternative text is present, in the form of text following the fragment identifier, and if so processing moves to step 405. At step 405 the alternative text is extracted from the URL and processing moves to step 406. At step 406 the extracted alternative text is provided for rendering in the web page in place of the associated image. Processing then moves to step 407 and ends. If at step 402 the image is not referenced by a URL or at step 403 no fragment identifier is present in the URL or at step 404 no alternative text is provided in the URL fragment then processing moves from the respective step to step 408 where the relevant image is loaded from its specified source and provided for rendering in the web page. Processing then moves to step 407 and ends.

In another embodiment, the alternative text is displayed in addition to its associated image data. The alternative text may be displayed in response to a user interaction, for example, as hover text or in response to a command or a control instruction input or a menu option selection.

In a further embodiment, the image source name or filename or other selected identifier is provided for display in place of an image where no alternative text is provided within the associated URI.

In another embodiment, the encoding of the alternative text within the URI comprises a reference to the alternative text data. In other words, the URI comprises a reference or link to the alternative text stored outside of the URI. For example, the alternative text may be referenced by a URI, URL or other identifier encoded within the URI of the associated image data.

In a further embodiment, the alternative text encoded within the URI may be further identified after a reserved character. For example, the alternative text may be preceded by a tag such as "alttxt:" arranged to indicate that the text after the colon comprises the alternative text.

In another embodiment, the alternative text data is provided with metadata arranged to provide further options for the use of the alternative text, such as formatting of the text.

In a further embodiment, a source code editor such as an HTML code editor is provided with functionality for automatically identifying references by URI or URL to images within the code being edited or otherwise processed. In response to such automatic identification of such references, the user is prompted to input alternative text. The input alternative text is then automatically encoded within the identified URI or URL. The URI or URL with encoded alternative text is then output for insertion into the code being edited or otherwise processed. In other words, the output or product of the method or apparatus comprises one or more URLs or URIs comprising internally encoded alternative text. The URL or URI comprising alternative text may be provided to the user for approval before being inserted into the code being edited or otherwise processed in place of the originally identified reference by URI or URL to an image.

In a further embodiment, when a URL or URI comprising alternative text is inserted in the source code for a web page, such as HTML code, the encoded alternative text is extracted from the URI or URL and inserted into the source code as an alternative attribute to the URL or URI itself. For example, given the following URL with internally encoded alternative text:

www.ibm.com/image.gif#ibm_image

This may be represented in HTML as follows:

<img src="www.ibm.com/image.gif#ibm_image" alt="ibm_image"/>

The alternative text may be retained in the instance of the URL in the source code after its extraction for use in the alternative attribute or removed from the URL instance of the URL in the source code as follows:

<img src="www.ibm.com/image.gif" alt="ibm_image"/>

The source code editor application program may be arranged to perform the extraction process automatically in response to the identification of a suitable URI or URL the source code.

As will be understood by those skilled in the art, URIs or URLs with encoded alternative text as described herein may be used within any suitable source code and manipulated, created or inserted using any suitable text or code editor application program or source code interpreter or compiler.

As will be understood by those skilled in the art, any data source such as image, text, audio or video data, may be referenced by a URI or URL. Furthermore, any method or system program or application program under user control or program control may be arranged to augment a URI or URL with alternative text as described herein and to store such an augmented URI or URL for subsequent identification or location of the referenced data resource.

As noted above, the hash (#) character is a reserved character in the standard specified syntax of URIs and URL, that is, as specified in the Internet Engineering Task Force (IETF) standards for URIs or URLs. Thus, in the context of loading image or other data for use within a web page, as opposed to loading a whole web page, the hash (#) character is likely to be contextually redundant. As will be understood by those skilled in the art, any suitable contextually redundant reserved character or group of characters are suitable candidates for indicating following alternative text and may be used with or without additional identifiers such as the "alttxt:" tag noted above.

As will be understood by those skilled in the art, the functionality of the alternative text management module described above may be provided for any suitable system or application program and may be provided as integrated functionality, as an additional module or plug-in or as a stand-alone program.

As will be understood by those skilled in the art, a URI may comprise a URL. In addition, a URI may comprise a universal resource number (URN).

In the above description references to alternative text being stored or encoded within a URI or URL is intended to mean that the alternative text data or an identification of such data by reference is encoded within the standard defined syntax for URIs or URLs.

As will be understood by those skilled in the art, the alternative text may be provided for and associated with any suitable data other than image data such as audio or video data. As will be understood by those skilled in the art, alternative text is descriptive text for the associated data such an image, audio or any other suitable data representation.

As will be understood by those skilled in the art, embodiments of the invention may be applied to any program arranged to display data comprising images with which alternative text may be associated and where the image source is identified via a URI. For example, a program that displays icon images in a GUI of an application program may be provided with alternative text in the manner described herein.

As will be understood by those skilled in the art, the image or alternative text data may be provided for communication to a user by any suitable means or combination thereof, for example, visually via a visual display, by audio via an audio screen reader, by touch via a Braille or other touch based display, terminal or output device.

Encoding the alternative text within the URI or URL for the image data to which it relates reduces the possibility of the alternative text being separated from its associated image. As a result, alternative text is more likely to be present and less likely to require replacement. Furthermore, alternative text is more likely to remain consistent with its associated data. The chances of conflicting versions of alternative text existing in a given system are reduced. Such URI/URL encoded alternative text is easy to pass around within a program due to the unitary form of the image and associated alternative text.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples shown and described. Accordingly, departures may be made from such details without departure from the scope of applicant's general inventive concept.

As will be appreciated by one skilled in the art, aspects of the present invention may be embodied as a system, method, computer program product or computer program. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Java and all Java-based trademarks and logos are trademarks or registered trademarks of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

For the avoidance of doubt, the term "comprising", as used herein throughout the description and claims is not to be construed as meaning "consisting only of".

What is claimed is:

1. A method, comprising:
processing, by a web browser application program, code for a web page to display the web page;
identifying, by the web browser application program, from the code a URI specifying an image data file for an image to be displayed in the web page;
determining, by the web browser application program, whether the URI of the image data file includes a fragment identifier;
in response to determining that the image data file includes a fragment identifier, determining whether text follows the fragment identifier;
in response to determining that text follows the fragment identifier, using the text to identify alternative text for the image; and
rendering in the web page the alternative text in place of the image.

2. The method according to claim 1 wherein the fragment identifier is a hash symbol.

3. The method according to claim 1 wherein the fragment identifier is contextually redundant.

4. The method according to claim 1 wherein, in response to an absence of the text following the fragment identifier, rendering in the web page the image.

5. The method according to claim 1 wherein the alternative text is provided with metadata specifying a formatting of the alternative text in the web page.

6. The method according to claim 1 wherein the image data file identified by the URI is retrieved for use in association with the alternative text.

7. The method according to claim 1 wherein the alternative text is arranged to be displayed in addition to the image.

8. The method according to claim 1 wherein the alternative text is arranged to be displayed in place of the image in response to a user control input.

9. The method according to claim 1 wherein the text following the fragment identifier comprises a link to the alternative text stored outside of the URI.

10. An apparatus for providing alternative text for display in association with image data, the apparatus comprising:
   a computer having a processor; and
   an application program executable by the processor to:
      process code for a web page to display the web page;
      identify from the code a URI specifying an image data file for an image to be displayed in the web page;
      determine whether the URI of the image data file includes alternative text for the image encoded using a reserved character in URL syntax, the reserved character being contextually redundant in the context of a source image data file;
      in response to the URI of the image data file lacking the reserved character, load the image for display in the web page; and
      in response to the URI of the image data file having the reserved character, extract the identified alternative text and load the alternative text for display in the web page in place of the image.

11. The apparatus according to claim 10 wherein the application program determines whether the reserved character comprises a fragment identifier.

12. The apparatus according to claim 10 wherein the application program retrieves the image data identified by the URI for use in association with the alternative text.

13. The apparatus according to claim 10 wherein the application program displays the alternative text in addition to the image data in response to a user interaction.

14. The apparatus according to claim 10 wherein the application program identifies a link within the URI identifying the alternative text provided externally to the URI.

15. The apparatus according to claim 10 wherein the application program identifies metadata with the alternative text specifying a formatting of the alternative text in the web page.

16. A computer program product for providing alternative text for display in association with image data, the computer program product comprising a non-transitory computer-readable medium having computer-readable program code embodied therewith, the computer-readable program code being configured to:
   process code for a web page to display the web page;
   identify from the code a URI specifying an image data file for an image to be displayed in the web page;
   determine whether the URI of the image data file includes alternative text for the image encoded using a reserved character in URL syntax, the reserved character being contextually redundant in the context of a source image data file;
   in response to the URI of the image data file lacking the reserved character, load the image for display in the web page; and
   in response to the URI of the image data file having the reserved character, extract the identified alternative text and load the alternative text for display in the web page in place of the image.

17. The computer program product according to claim 16 wherein the computer-readable program code is configured to determine whether the reserved character comprises a fragment identifier.

18. The computer program product according to claim 16 wherein the computer-readable program code is configured to identify a link within the URI identifying the alternative text provided externally to the URI.

19. The computer program product according to claim 17 wherein the computer-readable program code is configured to display the alternative text in addition to the image data in response to a user interaction.

20. The computer program product according to claim 17 wherein the computer-readable program code is configured to identify metadata with the alternative text specifying a formatting of the alternative text in the web page.

* * * * *